UNITED STATES PATENT OFFICE.

WALLACE SAVAGE, OF PHILADELPHIA, PENNSYLVANIA.

ASPHALT-LIKE COMPOSITION AND PROCESS OF MAKING THE SAME.

1,279,918.   Specification of Letters Patent.   Patented Sept. 24, 1918.

No Drawing.   Application filed August 4, 1917.   Serial No. 184,503.

*To all whom it may concern:*

Be it known that I, WALLACE SAVAGE, a citizen of the United States, residing at Philadelphia, in the county of Philadelphia and State of Pennsylvania, have invented certain new and useful Improvements in Asphalt-Like Compositions and Processes of Making the Same, of which the following is a specification.
This invention relates to the treatment of asphalt like materials such for example as asphalt, bitumen, petroleum pitch, coal tar pitch, and like materials commonly employed in the manufacture of prepared roofing, asphalt pavement and other road surfacing materials, water-proof fabrics, rust proofing materials, insulation for wire, expansion joints for concrete and the like, and has particular reference to the production of an improved asphalt like material of greater rigidity and durability and less brittleness than asphalt like materials with which I am familiar and to a prepared roofing embodying such product.
I have discovered that asphalt like materials and particularly those of the character above set forth may be advantageously treated by incorporating therewith spent fullers' earth and particularly spent fullers' earth which has been used in refining vegetable and animal oils.

In the practice of my process I incorporate spent fullers' earth with asphalt like materials preferably by melting the asphalt and thoroughly incorporating the spent fullers' earth therewith by stirring or otherwise. The spent fullers' earth can however be mixed with the asphalt material by grinding the latter and thoroughly mixing the spent fullers' earth with such ground material.

While the proportions in which the spent fullers' earth can be advantageously added to the asphalt like material may be widely varied I have found that advantageous results may be obtained in making coating material for paper and the like in the manufacture of prepared roofing by incorporating with the asphalt like material from 15 to 25 per cent. by weight of spent fullers' earth.

In my experiments I have found that the quality of asphalt like materials is improved by the addition of even 1 per cent. of spent fullers' earth with respect to the weight of the resultant mass, and I have successfully employed as high as 75 per cent. of fullers' earth with respect to the weight of the resultant mass, in the production of an asphalt like composition where flexibility of the finished material is not required.

In preparing my improved composition I have found it advantageous to subject the spent fullers' earth either before or after its incorporation in the asphalt like material to an oil hardening process. In such oil hardening process the material may be advantageously heated to a temperature of approximately from 300 to 700° F., for preferably from 2 to 24 hours, or air may be blown through the heated fullers' earth or the melted composition containing it for preferably from 1 to 12 hours or I may add to the spent fullers' earth or the melted composition containing it vulcanizing materials as sulfur or sulfur compounds such as sulfur chlorid, or similar vulcanizing materials, preferably in the proportions, where sulfur is used, of from 1 to 3 parts by weight to 100 parts by weight of the spent fullers' earth or fullers' earth content of the compound. If sulfur compounds are employed it is to be understood that the proportion of the vulcanizing material must be correspondingly increased. I may also add to the spent fullers' earth or composition containing it, saponifying materials, preferably saponifying agents adapted to produce insoluble or mineral soaps, such for example as lime. Where lime is used it is preferably added in the proportions of from one-fourth to three parts by weight to 100 parts by weight of the spent fullers' earth or fullers' earth content of the material.

In the manufacture of prepared roofing employing my improved asphalt like composition the material is applied to porous paper, such for example as what is known in the art as "felt" in accordance with the usual practice in the prepared roofing art.

While I have described in detail the preferred practice of my process it is to be understood that I am not restricted to the proportions or details of procedure set forth, that in my improved composition I may employ, in addition to asphalt or asphalt like material, such additional ingredients as are commonly employed in connection therewith and that known chemical equivalents of the reagents hereinbefore set forth may be employed, all without departure from the spirit of my invention or the scope of the subjoined claims.

Having thus described my invention I claim:

1. The herein described process which consists in adding fullers' earth to asphalt like materials.

2. The herein described process which consists in adding fullers' earth to asphalt like materials in the approximate proportions of from one-fourth to 75 parts by weight of spent fullers' earth to 25 parts by weight of asphalt like material.

3. The herein described process which consists in adding spent fullers' earth to asphalt like materials and subjecting the material to an oil hardening process.

4. The herein described process which consists in adding spent fullers' earth to asphalt like materials and subjecting the material to an oil oxidization treatment.

5. The herein described process which consists in adding spent fullers' earth to asphalt like ma'>rial and blowing air therethrough.

6. The herein described product comprising spent fullers' earth and asphalt like material.

7. The herein described product comprising spent fullers' earth subjected to an oil hardening process and asphalt like material.

8. The herein described product comprising spent fullers' earth subjected to an oxidizing process, and asphalt like material.

9. The herein described product comprising spent fullers' earth and asphalt like material in the approximate proportions of from ¼ to 75 parts by weight of spent fullers' earth to 25 parts by weight of asphalt like material.

In testimony whereof I affix my signature.

WALLACE SAVAGE.